United States Patent
Li

(10) Patent No.: US 7,924,557 B2
(45) Date of Patent: Apr. 12, 2011

(54) RETAINING APPARATUS FOR DATA STORAGE DEVICE

(75) Inventor: Zhan-Yang Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 93 days.

(21) Appl. No.: 12/534,215

(22) Filed: Aug. 3, 2009

(65) Prior Publication Data

US 2010/0295427 A1   Nov. 25, 2010

(30) Foreign Application Priority Data

May 25, 2009   (CN) .......................... 2009 1 0302595

(51) Int. Cl.
   *G06F 1/16*   (2006.01)
(52) U.S. Cl. ................................. 361/679.37
(58) Field of Classification Search ............. 361/679.33, 361/679.37
   See application file for complete search history.

(56) References Cited

U.S. PATENT DOCUMENTS

| | | | | |
|---|---|---|---|---|
| 5,654,873 A * | 8/1997 | Smithson et al. | ........ | 361/679.37 |
| 6,325,353 B1 * | 12/2001 | Jiang | ........................ | 361/679.33 |
| 6,560,098 B1 * | 5/2003 | Beinor et al. | ............ | 361/679.39 |
| 6,603,657 B2 * | 8/2003 | Tanzer et al. | ............ | 361/679.33 |
| 6,661,651 B1 * | 12/2003 | Tanzer et al. | ............ | 361/679.33 |
| 6,683,785 B1 * | 1/2004 | Chen | ......................... | 361/679.33 |
| 6,876,547 B2 * | 4/2005 | McAlister | ................ | 361/679.33 |
| 6,891,723 B1 * | 5/2005 | Lin et al. | .................. | 361/679.33 |
| 6,927,973 B2 * | 8/2005 | Song et al. | ............... | 361/679.33 |
| 7,072,177 B2 * | 7/2006 | Peng et al. | ............... | 361/679.33 |
| 7,251,132 B1 * | 7/2007 | Paul et al. | ................ | 361/679.33 |
| 7,321,489 B2 * | 1/2008 | McAlister | ................ | 361/679.33 |
| 7,477,511 B2 * | 1/2009 | Hsu et al. | ................. | 361/679.37 |
| 7,551,427 B1 * | 6/2009 | Blaugrund et al. | ...... | 361/679.38 |
| 2007/0211422 A1 * | 9/2007 | Liu et al. | ....................... | 361/685 |
| 2008/0204994 A1 * | 8/2008 | Wang | ............................ | 361/685 |

* cited by examiner

*Primary Examiner* — Lisa Lea-Edmonds
(74) *Attorney, Agent, or Firm* — D. Austin Bonderer

(57) ABSTRACT

A retaining apparatus for at least one data storage device includes a tray and a retaining device. The tray is used for receiving the at least one data storage device. The retaining device includes base member, an arm member, and a retaining member. The base member is attached to the tray. The arm member is pivotably attached to the base member about a pivot axis. The pivot axis is located at a first end of the arm member. The retaining member is movably attached to the base member along a first direction. The retaining member includes an engaging portion and a retaining portion. The arm member has a driving portion at the first end engaged with the engaging portion. The first direction is substantially perpendicular to the pivot axis. The retaining member is capable of being driven to move along the first direction by rotating the arm member.

20 Claims, 8 Drawing Sheets

RETAINING APPARATUS FOR DATA STORAGE DEVICE

BACKGROUND

1. Technical Field

The disclosure generally relates to a retaining apparatus for data storage devices, especially to a retaining apparatus with a tray for receiving and retaining at least one data storage device.

2. Description of Related Art

Usually, a data storage device, such as a hard disk drive is simply screwed to a computer enclosure. This conventional mounting means can be complex, difficult and substantially wastes time. In addition, in use, vibration of the data storage device may cause the screws to come loose and may result in damage to the data storage device. Understandably, some attempts have been taken to introduce a mounting apparatus for a data storage device without screws.

DETAILED DESCRIPTION

Figure 7:
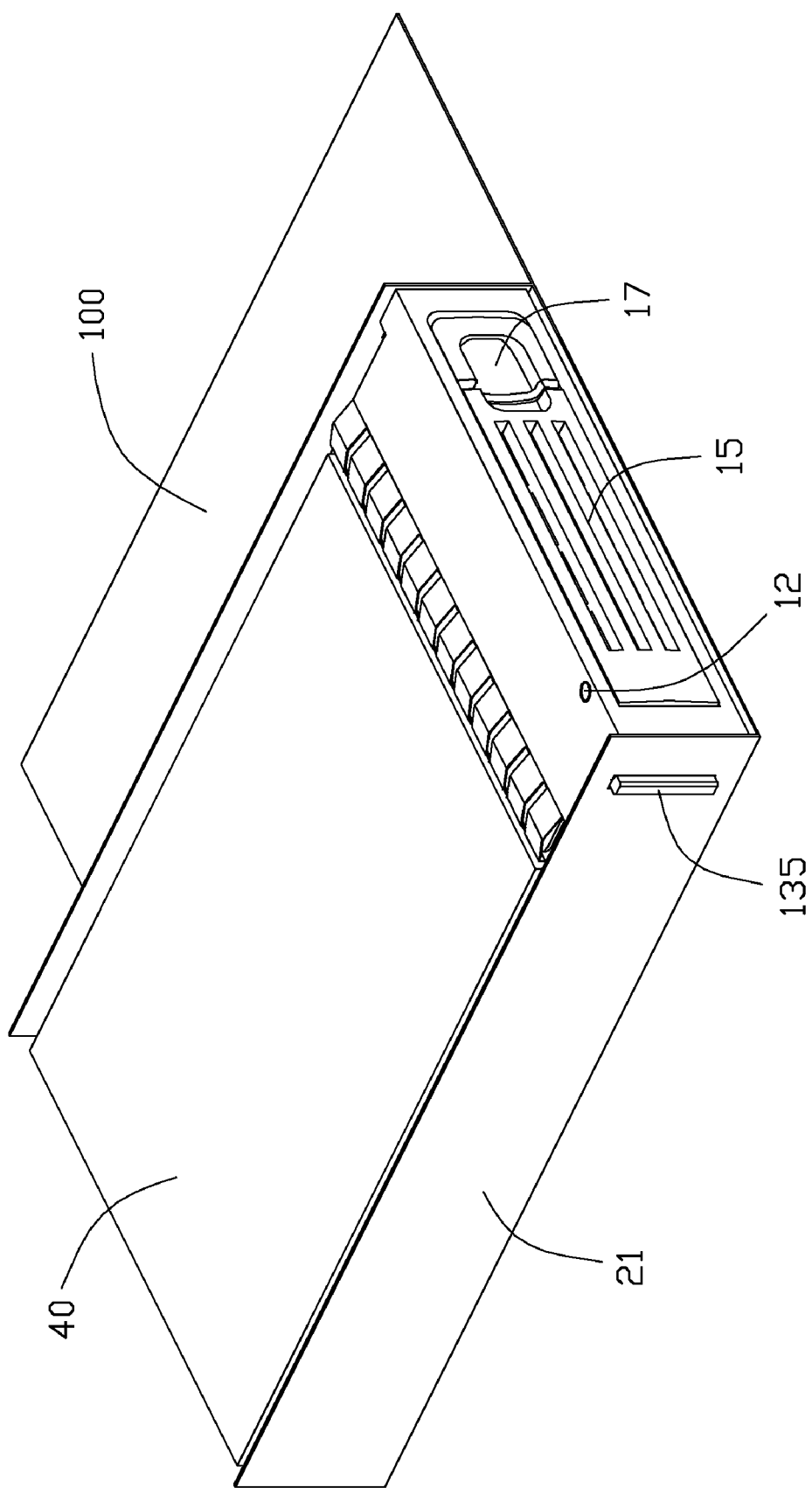
FIG. 7 is a pre-assembled view of the retaining apparatus and a bracket.

Referring to FIG. 7, a bracket 100 is used in a computer or an electronic device for mounting at least one retaining apparatus for data storage device 40. The bracket 100 includes two parallel side plates 21. A slideway is defined between the two side plates 21 for receiving the retaining apparatus. Each side plate 21 defines a rectangular retaining opening 23.

Figure 1:
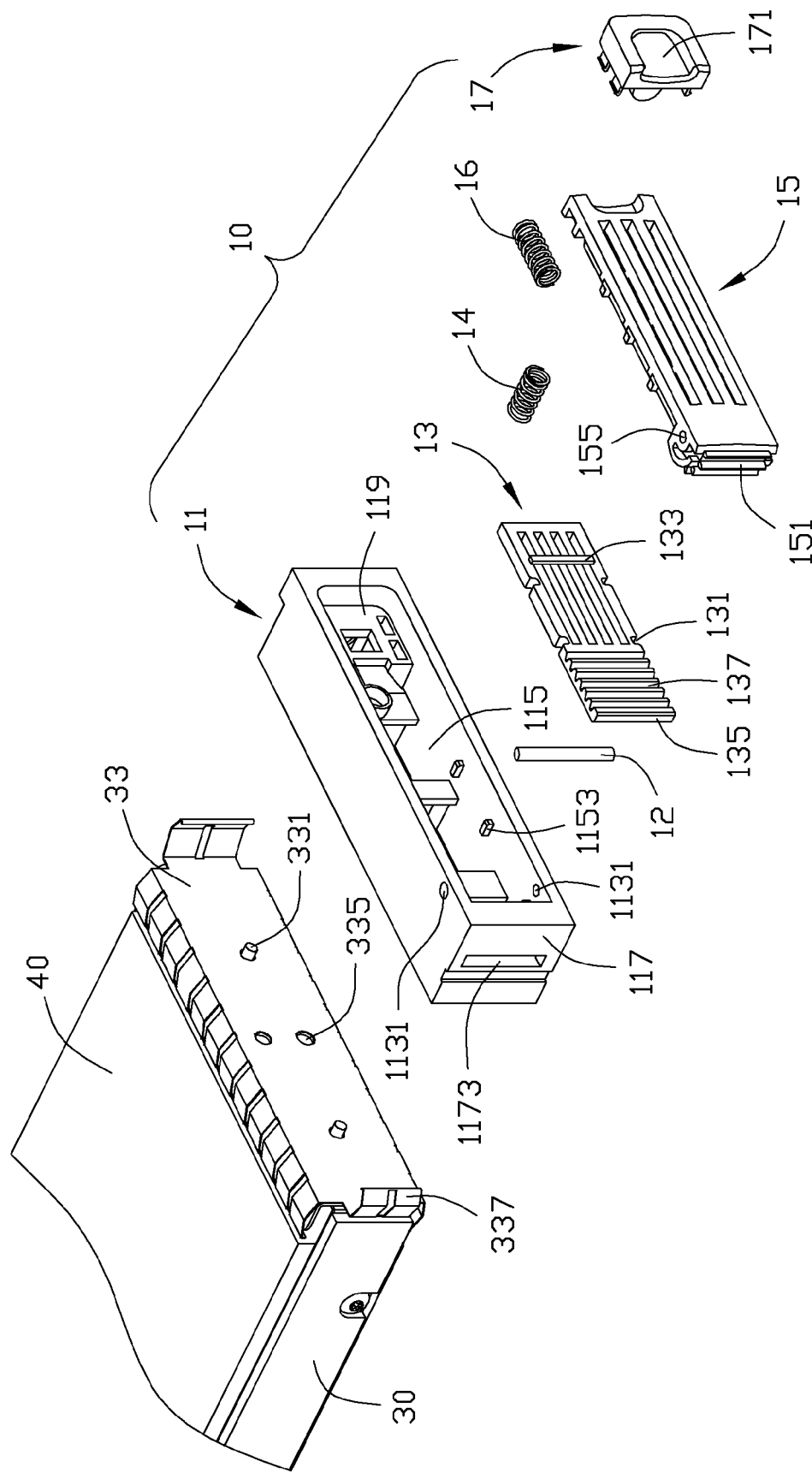
FIG. 1 is an exploded, isometric view of a retaining apparatus.
Figure 2:
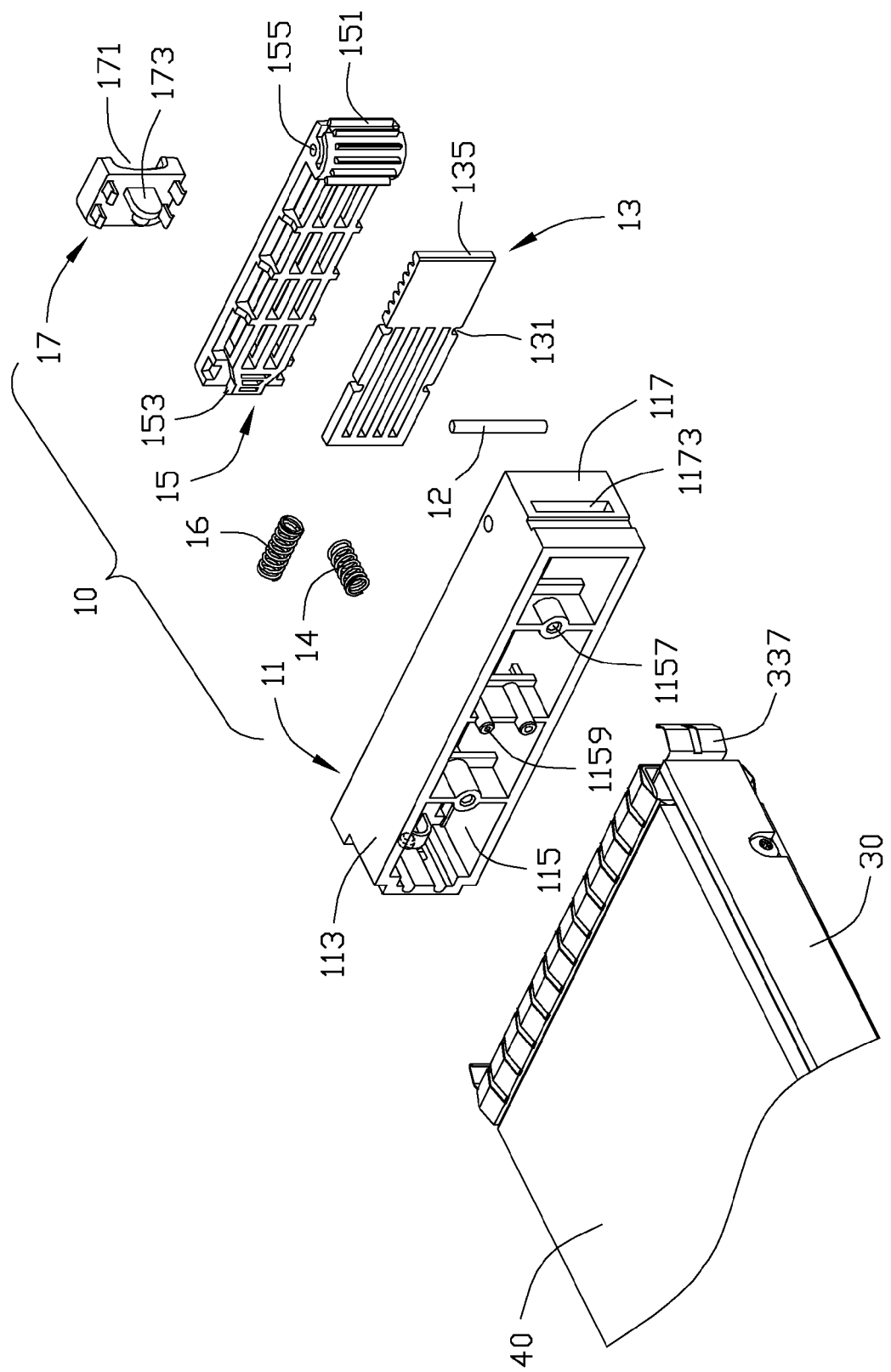
FIG. 2 is similar to FIG. 1, but showing in another aspect.
Figure 3:
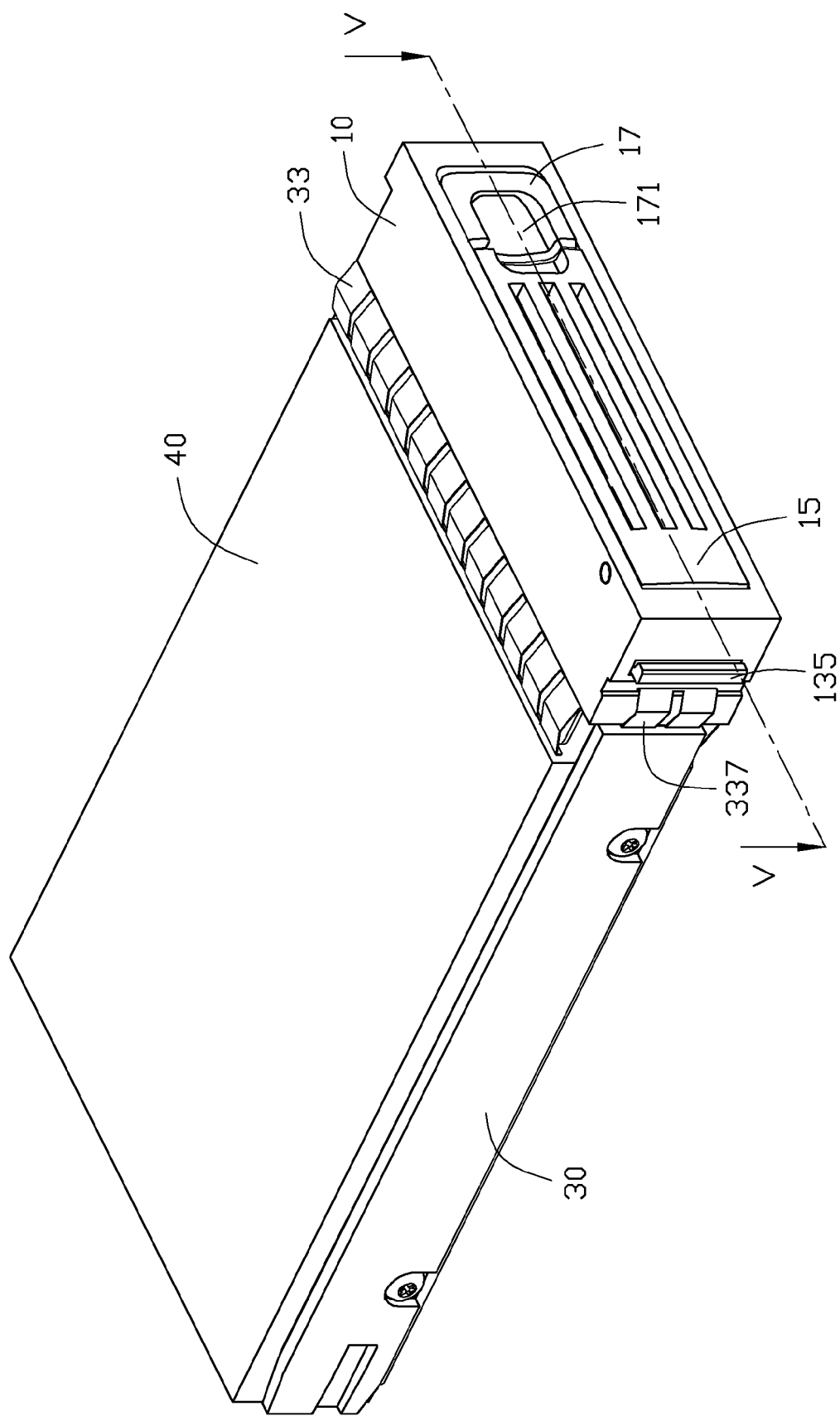
FIG. 3 is an assembled view of FIG. 1.
Figure 4:
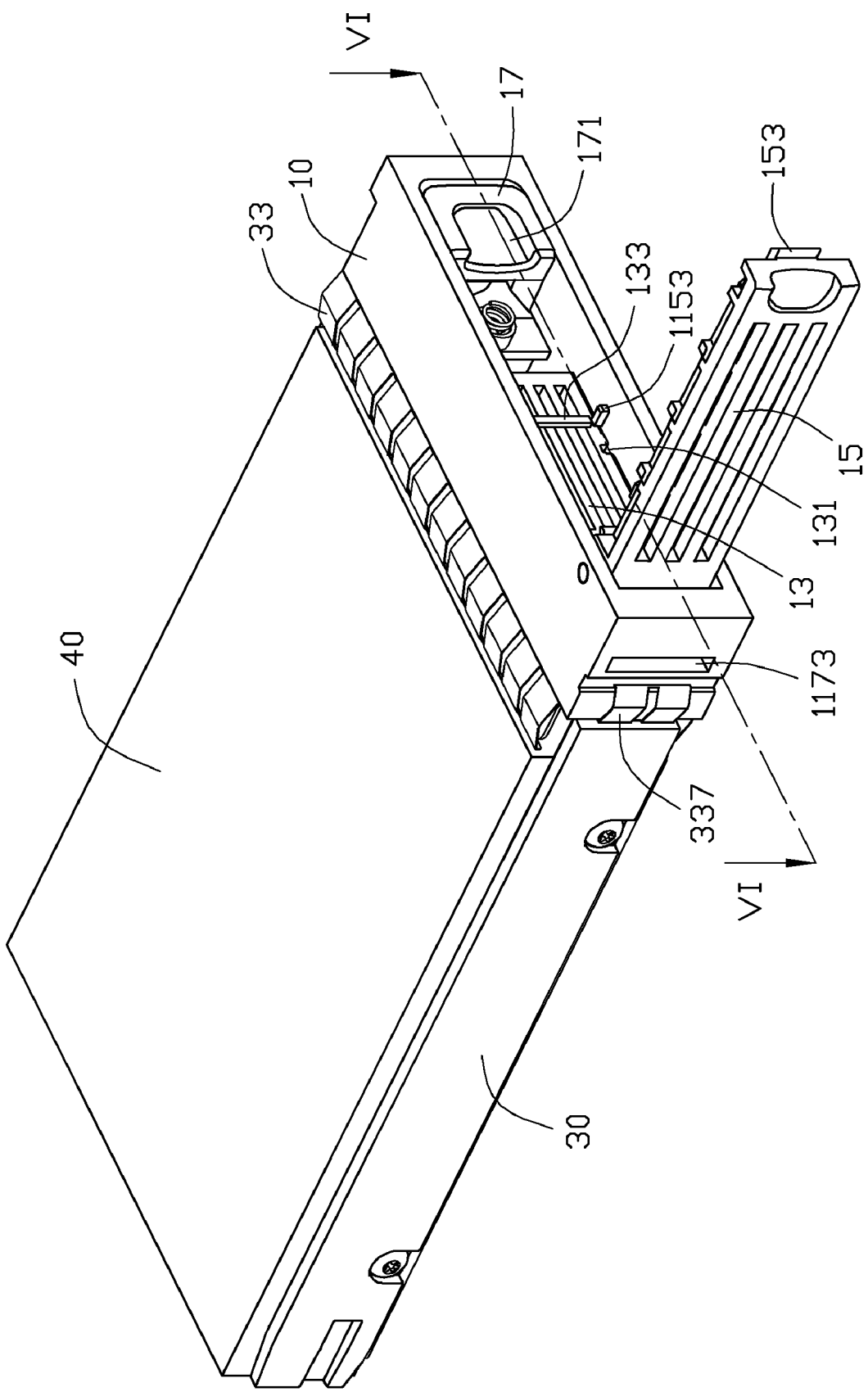
FIG. 4 is similar to FIG. 3, but an arm member is released.
Figure 5:
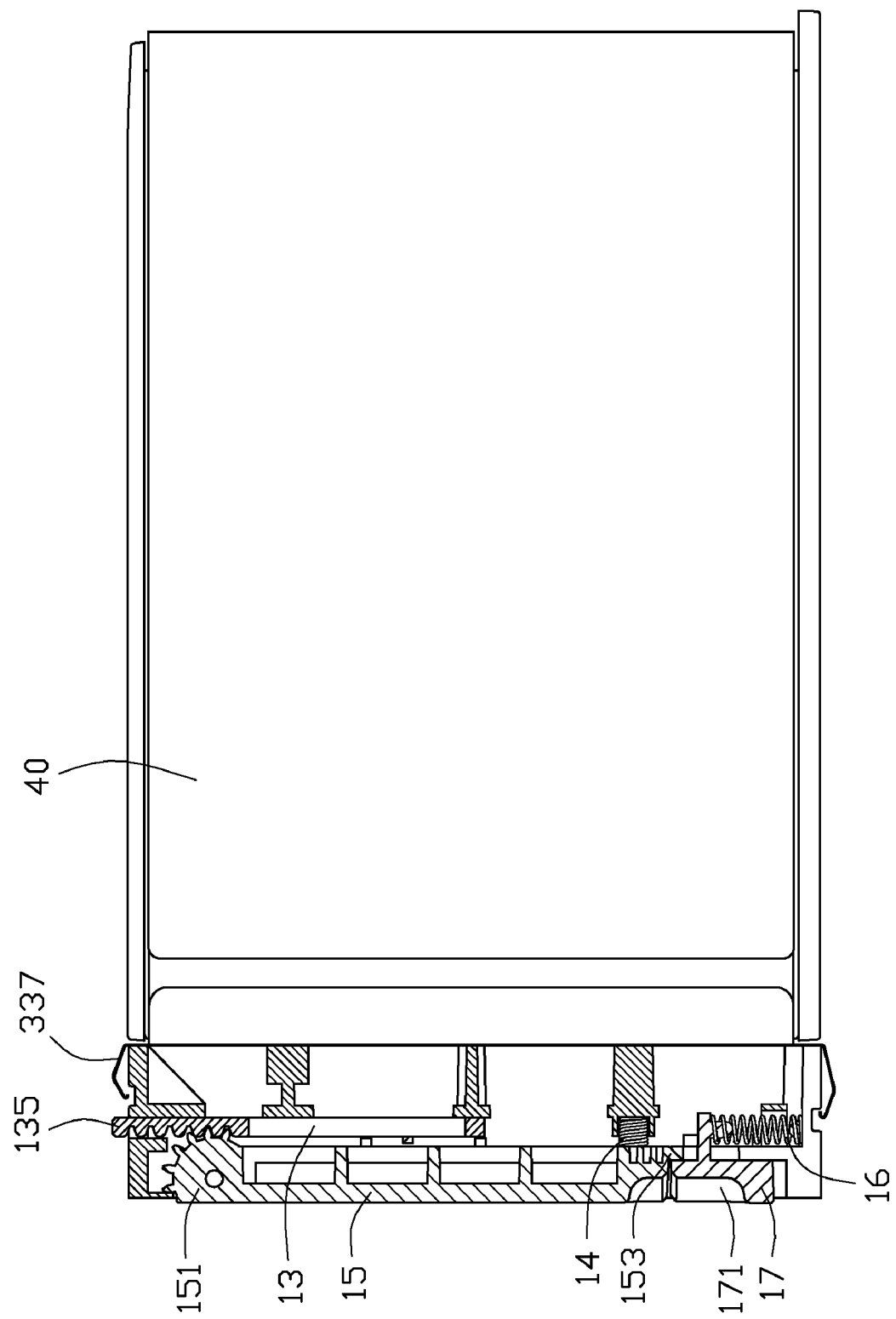
FIG. 5 is a sectional view of FIG. 3.
Figure 6:
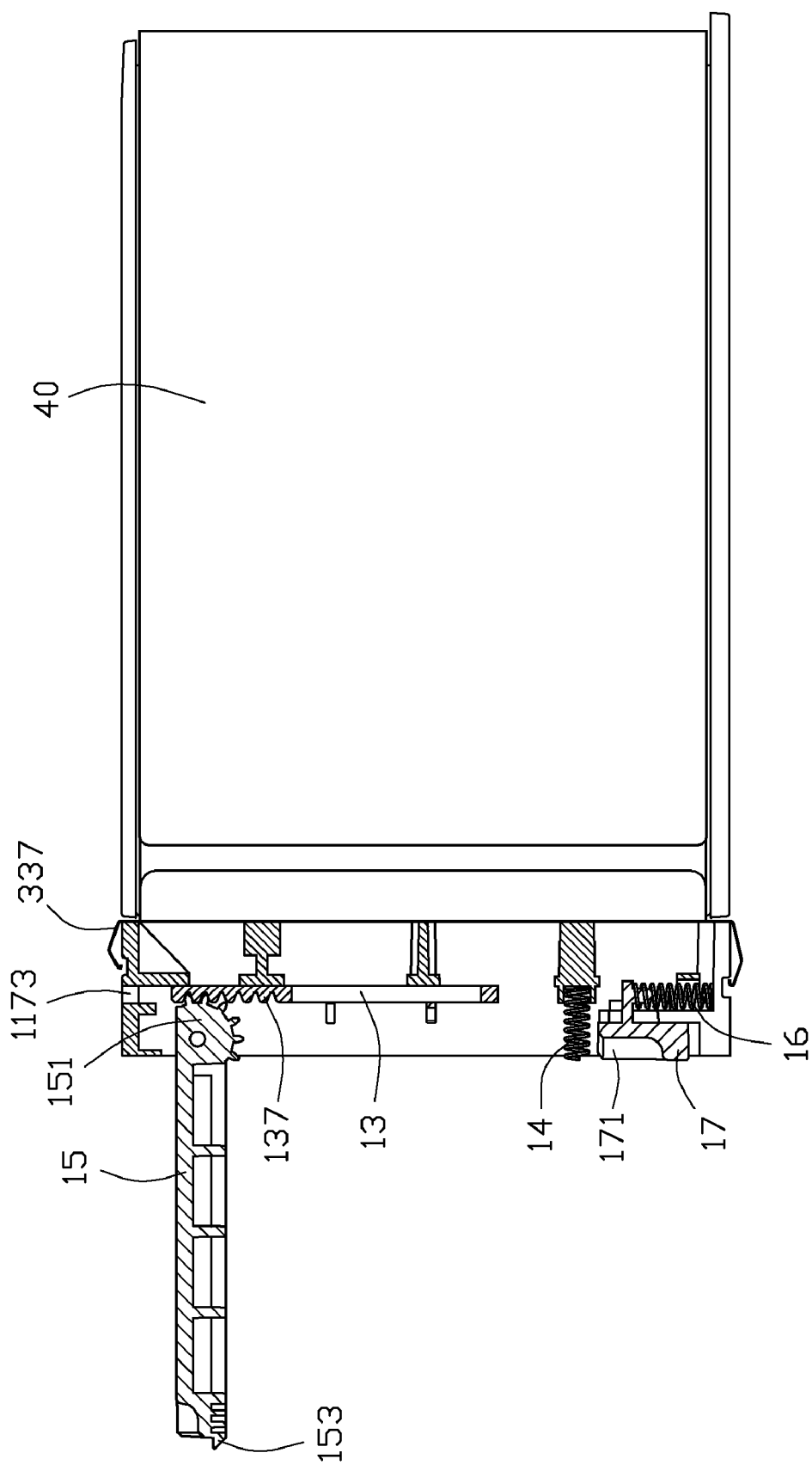
FIG. 6 is a sectional view of FIG. 4.

Referring to FIG. 1 and FIG. 2, each retaining apparatus includes a tray 30 and a retaining device 10. At least one screw post 331 protrudes from the tray 30. At least one positioning hole 335 is defined in the tray 30.

A shielding clip 33 is attached to the tray 30. The shielding clip 33 can be made from flake metal for providing electromagnetic interference (EMI) shielding. The shielding clip 33 has a pair of L-shaped resilient touch fingers 337 on lateral sides thereof.

The retaining device includes a base member 11, a retaining member 13, an arm member 15, and a blocking member 17.

The base member 11 defines a pair of pivot holes 1131 at one end thereof and has a restricting portion 119 at an opposite end thereof. A pivot shaft 12 extends through the two pivot holes 1131 to define a pivot axis. At least one screw hole 1157 is defined corresponding to the at least one screw post 331. The base member 11 has a cavity 115 to receive the retaining member 13, the arm member 15, and the blocking member 17. At least one positioning post 1159 protrudes from the base member 11 corresponding to the at least one positioning hole 335. Two restricting tabs 1153 aligned along a first direction protrude from the base member 11 in the cavity 115. A restricting portion 119 is formed on the base member 11. A channel 1173 is defined at a lateral side 117 of the base member 11.

The retaining member 13 is movably attached to the base member 11 along the first direction. The retaining member 13 includes an engaging portion 137 and a retaining portion 135. The engaging portion 137 includes a plurality of engaging teeth. The retaining member 13 defines two cutouts 131 corresponding to the two restricting tabs 1153. The retaining member 13 has a positioning rib 133, and when the positioning rib 133 is aligned with one of the restricting tabs 1153, the arm member 15 is rotated to a releasing position.

The arm member 15 defines a pivot hole 155 in a first end thereof corresponding to the pivot shaft 12 and has a driving portion 151 corresponding to the engaging portion 137. The driving portion 151 has a plurality of driving teeth that mesh with the engaging teeth of the engaging portion 137. A wedge-shaped protrusion 153 extends from a second end of the arm member 15 opposite to the first end. A coil spring 14 is located between the base member 11 and the arm member 15 and provides ejection force to the arm member 15 to rotate the arm member 15 away from the base member 11.

The blocking member 17 is movably attached to the base member 11 along the first direction. The blocking member 17 is mounted in the restricting portion 119 of the base member 40. The blocking member 17 is capable of blocking the protrusion 153 of the arm member 15. A recess 171 is defined in the blocking member 17 for allowing the operation of the blocking member 17. The blocking member 17 has a tab 173 extending toward the base member 11. A coil spring 16 is located between the base member 11 and the tab 173 to bias the blocking member 17 towards an original state.

Referring through FIG. 3 to FIG. 6, when assembling the retaining apparatus, the base member 11 is first mounted to the tray 30 with the shielding clip 33 located therebetween. The retaining member 13 is moved into the cavity 115 of the base member 11 with the cutouts 131 aligned with the restricting tabs 1153. The retaining member 13 is moved to the original position with the positioning rib 133 aligned with the one of the restricting tabs 1153. The arm member 15 is pivotably fixed to the base member 11 about the pivot axis, and the driving portion 155 meshes with the engaging portion 137. The arm member 15 then is rotated parallel to the base member 11, and the spring 14 is deformably located between the base member 11 and the arm member 15. The blocking member 17 is movably mounted to the base member 11 and the spring 16 is deformably located between the base member 11 and the blocking member 17.

Figure 8:
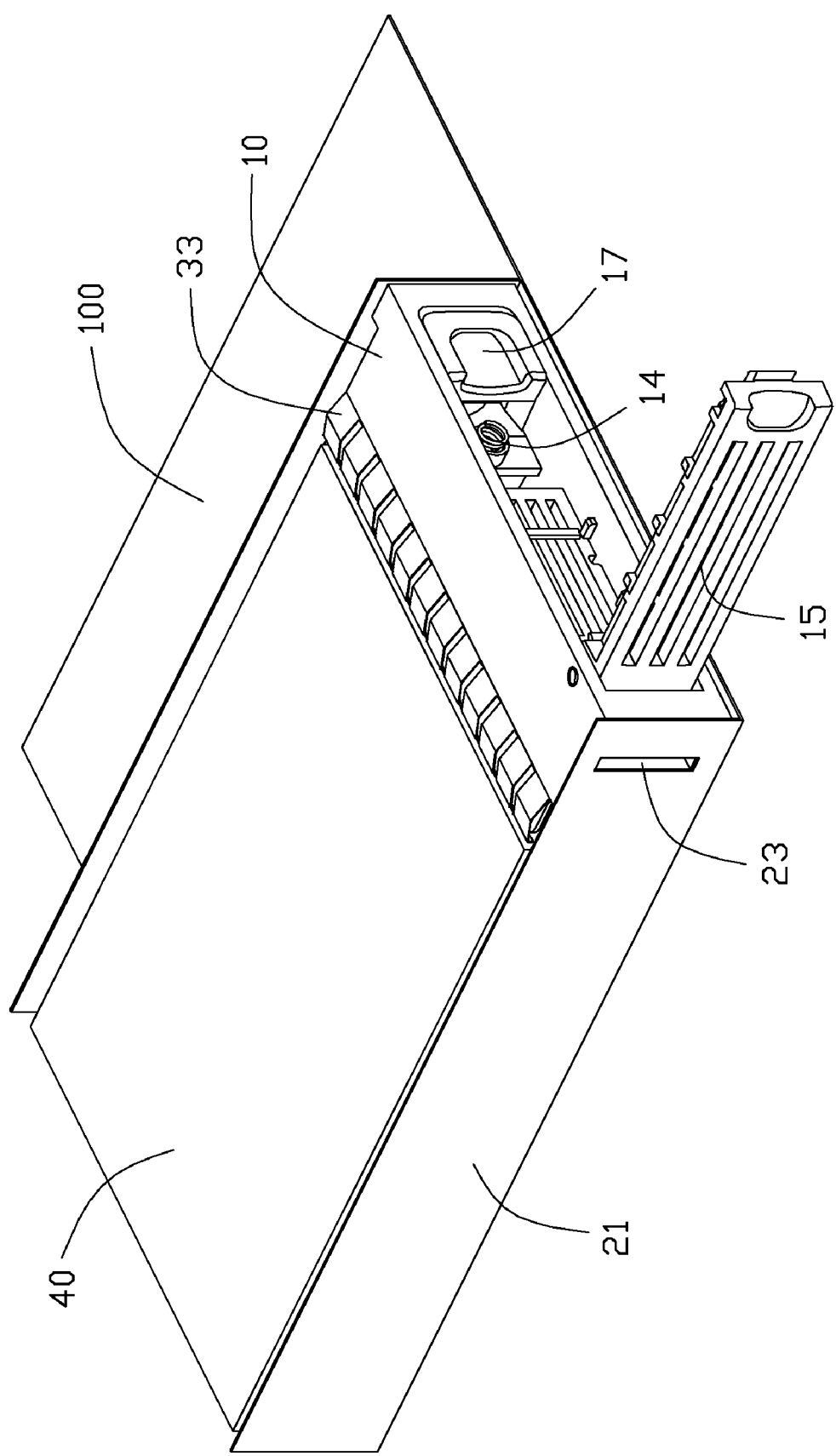
FIG. 8 is similar to FIG. 7, but showing the retaining apparatus mounted in the bracket.

Referring to FIG. 7 and FIG. 8, when mounting the retaining apparatus into the bracket 100, the arm member 15 is angled from the base member 40, and the retaining portion 135 resides in the cavity 115 of the base member 11. The tray 30 and the retaining device 10 are completely slid into the slideway of the bracket 100 with the channel 1173 aligned with the retaining opening 23. Each resilient touch finger 337 is located between each side plate 21 and a lateral side of the base member 11. Then the arm member 15 is pressed to rotate to the base member 11, gradually moving the retaining portion 135 through the channel 1173 to engage with the side plate 21 at the retaining opening 23. When the second end of the arm member 15 reaches the base member 11, the wedge-shaped protrusion 153 urges the blocking member 17 to move sideways. The blocking member 17 moves back to its original position and blocks the arm member 15 from rotating outwardly when the arm member 15 is completely moved to the base member 11, and the spring 16 is pressed. The retaining apparatus is then mounted to the bracket 100.

When removing the retaining apparatus from the bracket 100, the blocking member 17 is actuated. The arm member 15 rotates outwardly due to the resilient force of the spring 16. The retaining portion 135 moves into the cavity 115 of the base member 11 and disengages from the side plate 21 of the bracket 100. The retaining apparatus then is capable of being moved out of the bracket 100.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining apparatus for at least one data storage device, comprising:
   a tray for receiving the at least one data storage device; and
   a retaining device comprising:
      a base member attached to the tray;
      a retaining member movably attached to the base member along a first direction, the retaining member comprising an engaging portion and a retaining portion;
      an arm member pivotably attached to the base member about a pivot axis, the pivot axis being located at a first end of the arm member; the arm member having a driving portion at the first end engaged with the engaging portion; wherein the first direction is substantially perpendicular to the pivot axis; the retaining member is capable of being driven to move along the first direction by rotating the arm member; and
   wherein the arm member is rotatable between a retaining position where the arm member is positioned parallel to the base member, and the retaining portion is driven to protrude out of the base member, and a releasing position where the arm member is angled from the base member, and the retaining portion resides in the base member.

2. The retaining apparatus of the claim 1, wherein the engaging portion comprises a plurality of engaging teeth; the driving portion has a plurality of driving teeth that mesh with the engaging teeth.

3. The retaining apparatus of the claim 1, wherein at least two restricting tabs are aligned along the first direction and protrude from the base member to restrict the retaining member from moving outside the base member.

4. The retaining apparatus of the claim 3, wherein at least two cutouts are defined by the retaining member and correspond to the at least two restricting tabs.

5. The retaining apparatus of the claim 3, wherein a positioning rib is vertically located on the retaining member, and when the positioning rib is aligned with one of the restricting tabs, the arm member is in the releasing position.

6. The retaining apparatus of the claim 1, wherein a shielding clip is located between the tray and the base member for providing electromagnetic interference shielding.

7. The retaining apparatus of the claim 1, wherein a blocking member is movably attached to the base member parallel to the first direction, and the blocking member is capable of blocking the arm member at a second end of the arm member opposite to the first end.

8. The retaining apparatus of the claim 7, wherein a protrusion extends from the second end of the arm member to engage with the blocking member.

9. A computer comprising:
   a bracket comprising a side plate, the side plate comprising a retaining opening at a front end thereof; and
   a retaining apparatus comprising:
      a tray for receiving the data storage device; and
      a retaining device comprising:
         a base member attached to the tray;
         a retaining member movably attached to the base member along a first direction, the retaining member comprising an engaging portion and a retaining portion;
         an arm member pivotably attached to the base member about a pivot axis, the pivot axis being located at a first end of the arm member; the arm member having a driving portion at the first end engaged with the engaging portion; wherein the first direction is substantially perpendicular to the pivot axis; the retaining member is capable of being driven to move along the first direction by rotating the arm member; and
      wherein the arm member is rotatable between a retaining position where the arm member is positioned parallel to the base member, and the retaining portion is driven to protrude out of the base member to engage with the side plate at the retaining opening, and a releasing position where the arm member is angled from the base member, and the retaining portion resides in the base member and is disengaged from side plate.

10. The computer of the claim 9, wherein a blocking member is movably attached to the base member parallel to the first direction, and the blocking member is capable of blocking the arm member.

11. The computer of the claim 10, wherein a protrusion extends from the arm member to engage with the blocking member.

12. The computer of the claim 10, wherein a recess is defined in the blocking member for allowing the operation of the blocking member.

13. The computer of the claim 9, wherein a spring is located between the base member and the arm member to provide a biasing force.

14. The computer of the claim 9, wherein the engaging portion comprises a plurality of engaging teeth; the driving portion has a plurality of driving teeth that mesh with the engaging teeth.

15. The computer of the claim 9, wherein at least two restricting tabs protrude from the base member to prevent the retaining member from moving outside the base member.

16. The computer of the claim 15, wherein at least two cutouts are defined by the retaining member and correspond to the at least two restricting tabs.

17. The computer of the claim 15, wherein a positioning rib is vertically located on the retaining member, when the positioning rib is aligned with one of the restricting tabs, the arm member is in the releasing position.

18. The computer of the claim 9, wherein the tray comprises two side walls and an elastic cushion is attached to each side wall for shock absorption.

19. The computer of the claim 9, wherein a shielding clip is located between the tray and the base member for providing electromagnetic interference shielding.

20. The computer of the claim 9, wherein the shielding clip comprising a resilient touch finger and the touch finger is located between a lateral side of the base member and the side plate in the a retaining position.

* * * * *